United States Patent
Hsia et al.

(10) Patent No.: US 8,989,810 B2
(45) Date of Patent: Mar. 24, 2015

(54) METHODS PERFORMED BY WIRELESS COMMUNICATIONS DEVICES TO ALLEVIATE SELF-INTERFERENCE

(75) Inventors: En-Chieh Hsia, Kaohsiung (TW); Hsiao-Tung Lin, New Taipei (TW); Chu-Wei Lo, New Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 13/531,578

(22) Filed: Jun. 24, 2012

(65) Prior Publication Data

US 2013/0244720 A1 Sep. 19, 2013

Related U.S. Application Data

(60) Provisional application No. 61/611,092, filed on Mar. 15, 2012.

(51) Int. Cl.
*H04M 1/00* (2006.01)
*H04B 1/38* (2006.01)
*H04B 1/16* (2006.01)
*H04W 52/24* (2009.01)

(52) U.S. Cl.
CPC ............. *H04W 52/243* (2013.01); *H04B 17/13* (2013.01); *H04W 52/241* (2013.01); *H04W 52/245* (2013.01)
USPC ...................... 455/553.1; 455/574; 455/343.2

(58) Field of Classification Search
USPC ............... 455/552.1, 553.1, 572, 574, 343.2
See application file for complete search history.

(56) References Cited

U.S. PATENT DOCUMENTS

| | | | | |
|---|---|---|---|---|
| 7,660,565 | B2 * | 2/2010 | Patel et al. ..................... | 455/132 |
| 7,701,913 | B2 * | 4/2010 | Chen et al. ..................... | 370/338 |
| 7,856,000 | B2 | 12/2010 | Ross | |
| 8,457,559 | B2 * | 6/2013 | Gao et al. ..................... | 455/41.2 |
| 2008/0161024 | A1 * | 7/2008 | Sawaki et al. .................. | 455/462 |
| 2008/0176594 | A1 * | 7/2008 | Song et al. .................... | 455/522 |
| 2009/0042601 | A1 * | 2/2009 | Wang et al. ................. | 455/553.1 |
| 2009/0275355 | A1 * | 11/2009 | Tan et al. ...................... | 455/522 |
| 2010/0087224 | A1 * | 4/2010 | Kim et al. .................. | 455/552.1 |
| 2012/0129573 | A1 * | 5/2012 | Rofougaran .............. | 455/553.1 |
| 2012/0329515 | A1 * | 12/2012 | Husted et al. ............. | 455/552.1 |

FOREIGN PATENT DOCUMENTS

CN 101084650 A 12/2007
WO 2011100652 A1 8/2011

OTHER PUBLICATIONS

Navenn K. Yanduru et al., "A WCDMA, GSM/GPRS/EDGE receiver front end without interstage SAW filter", Jun. 11-13, 2006, Radio Frequency Integrated Circuits (RFIC) Symposium, 2006 IEEE.*
Dong Wang, "Patch Loaded Tri-Monopole Wideband Antenna for Mobile Applications", Sep. 11, 2009, Research in Motion, Ltd. pp. 391-394.*

* cited by examiner

*Primary Examiner* — Christopher M Brandt
(74) *Attorney, Agent, or Firm* — Winston Hsu; Scott Margo

(57) ABSTRACT

An embodiment of the invention provides a method to be performed by a wireless communications device. The wireless communications device includes at least a first wireless module and a second wireless module. According to the method, the wireless communications device obtains a quality indicator of the first wireless module. Then, the wireless communications device examines the quality indicator to determine whether to restrain a transmission power of the second wireless module for the first wireless module.

12 Claims, 4 Drawing Sheets

METHODS PERFORMED BY WIRELESS COMMUNICATIONS DEVICES TO ALLEVIATE SELF-INTERFERENCE

CROSS REFERENCE TO RELATED APPLICATIONS

This application claims the benefit of U.S. provisional application No. 61/611,092, filed on Mar. 15, 2012 and incorporated herein by reference.

BACKGROUND

1. Technical Field

The invention relates generally to wireless communications devices, and more particularly, to methods performed by wireless communications devices to alleviate self-interference.

2. Related Art

A wireless communications device, such as a mobile phone, may have a plurality of wireless modules designed based on a plurality of different communications standards. The wireless communications device may be subject to a problem of self-interference if two or more of its wireless modules are active at the same time, using close frequency bands. To mitigate such a problem, the wireless communications device may include a surface acoustic wave (SAW) filter to reject unwanted interference. However, this approach may not be an optimal solution because it may inevitably increase the wireless communications device's overall hardware cost.

SUMMARY

One of the objectives of the invention is to provide methods that alleviate the aforementioned self-interference problem.

An embodiment of the invention provides a method to be performed by a wireless communications device. The wireless communications device includes at least a first wireless module and a second wireless module. According to the method, the wireless communications device obtains a quality indicator of the first wireless module. Then, the wireless communications device examines the quality indicator to determine whether to restrain a transmission power of the second wireless module for the first wireless module.

Another embodiment of the invention provides a method to be performed by a wireless communications device. The wireless communications device includes at least a first wireless module and a second wireless module. The first wireless module is designed to perform wireless communications using an 1800 MHz band or a 1900 MHz band; the second wireless module is designed to perform wireless communications using a 2450 MHz band. According to the method, the wireless communications device obtains a quality indicator of the first wireless module. Then, the wireless communications device control a transmission power of the second wireless module according to the quality indicator.

Other features of the present invention will be apparent from the accompanying drawings and from the detailed description which follows.

BRIEF DESCRIPTION OF THE DRAWINGS

The invention is fully illustrated by the subsequent detailed description and the accompanying drawings, in which like references indicate similar elements.

DETAILED DESCRIPTION

Figure 1:
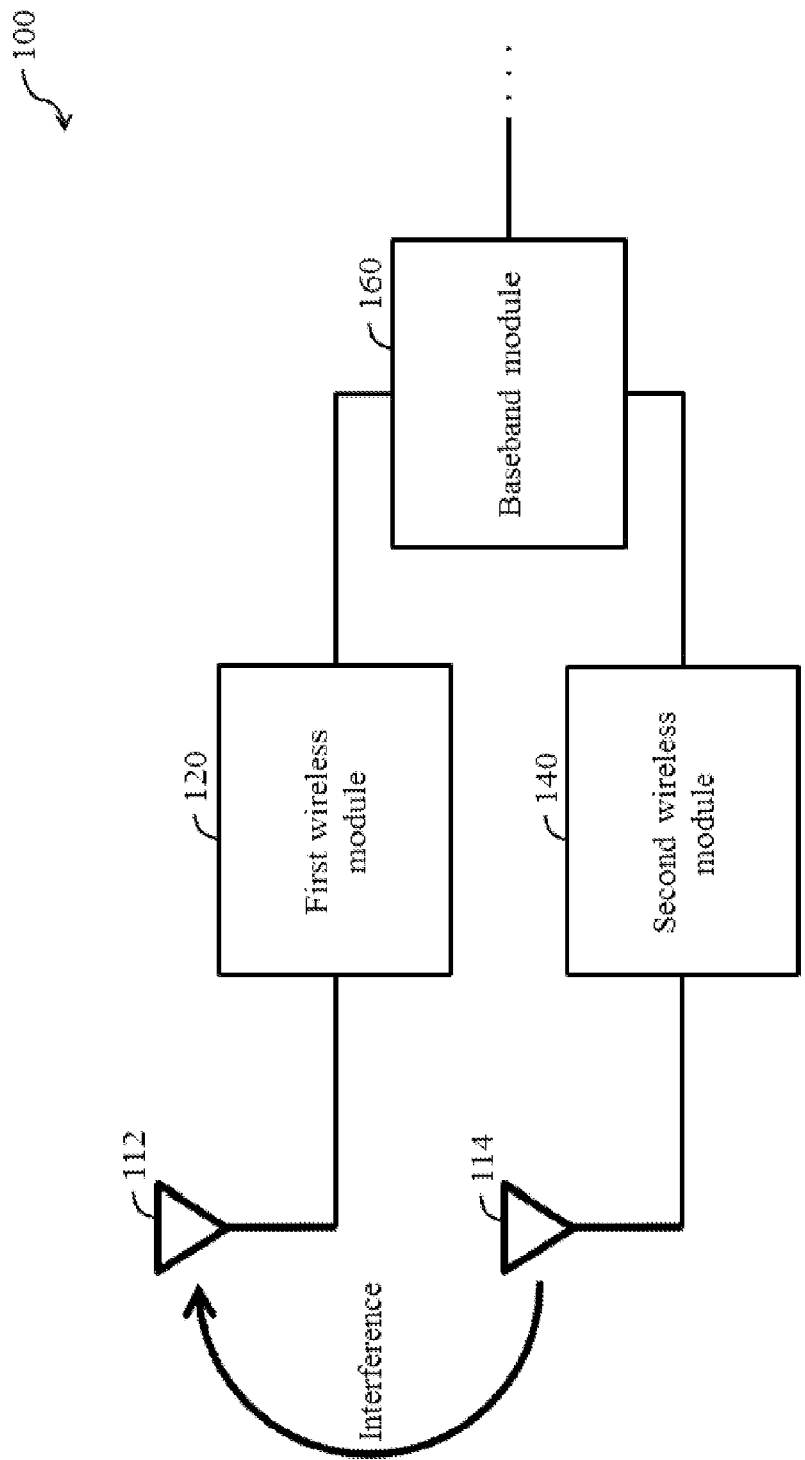
FIG. 1 shows a simplified block diagram of a wireless communications device according to an embodiment of the invention.

FIG. 1 shows a simplified block diagram of a wireless communications device according to an embodiment of the invention. The wireless communications device 100 may be a mobile phone, such as a feature phone or a smart phone; it may also be another kind of electronic device that can communicate with multiple remote devices wirelessly.

In addition to other components not depicted in FIG. 1, the wireless communications device 100 includes a first wireless module 120 and a second wireless module 140. Each of the two modules 120 and 140 has its own antenna, including a first antenna 112 and a second antenna 114, respectively. Furthermore, the two modules 120 and 140 are both coupled to a baseband module 160. The baseband module 160 may be further coupled to other components of the wireless communications device 100, which are not depicted in FIG. 1. For example, these other components may include an LCD module (LCM) of the wireless communications device 100. The baseband module 160 may control or coordinate the operations of the first and second wireless modules 120 and 140.

For example, the first wireless module 120 may be a wireless module designed based on the global system for mobile communications (GSM) standard and/or the general packet radio service (GPRS) communications standard, such as a GSM/GPRS radio frequency (RF) module. To work with the first wireless module 120, the baseband module 160 may need to function as a GSM/GPRS baseband module. The second wireless module 140 may be designed based on a communications standard using at least one of the industrial, scientific and medical (ISM) radio bands. As two examples, the communications standard may be the Bluetooth (BT) communication standard or the Wi-Fi communication standard. In other words, the second wireless module 140 may be a BT/Wi-Fi system on chip (SoC) coupled between the antenna 114 and the baseband module 160.

The wireless communications device 100 may suffer from self-interference if the two modules 120 and 140 are active and using close frequency bands at the same time. For example, while the second wireless module 140 is transmitting data using a 2450 MHz ISM band, the first wireless module 120 may be receiving data using an 1800 MHz digital cellular system (DCS) band or a 1900 MHz personal communications service (PCS) band. Although the two antennas 112 and 114 may be isolated from each other, some of the 2450 MHz RF signals leaving the second antenna 114 may inevitably be received by the first antenna 112 and deteriorate the first wireless module 120's performance. For example, the interference may worsen a noise figure of the first wireless module 120 and cause the module 120 to suffer from sensitivity degradation.

The aforementioned interference may be mitigated, at least to some extent, if the wireless communications device 100 includes a SAW filter set up within the first wireless module 120 or between the first wireless module 120 and the first antenna 112. But if the first wireless module 120 is a SAW-less module (i.e. it neither includes nor is coupled to a SAW filter), the aforementioned interference may be severe.

Whether the first wireless module 120 is a SAW-less one or not, the wireless communications device 100 will be better off by employing some mechanisms to deal with the self-interference problem.

Figure 2:
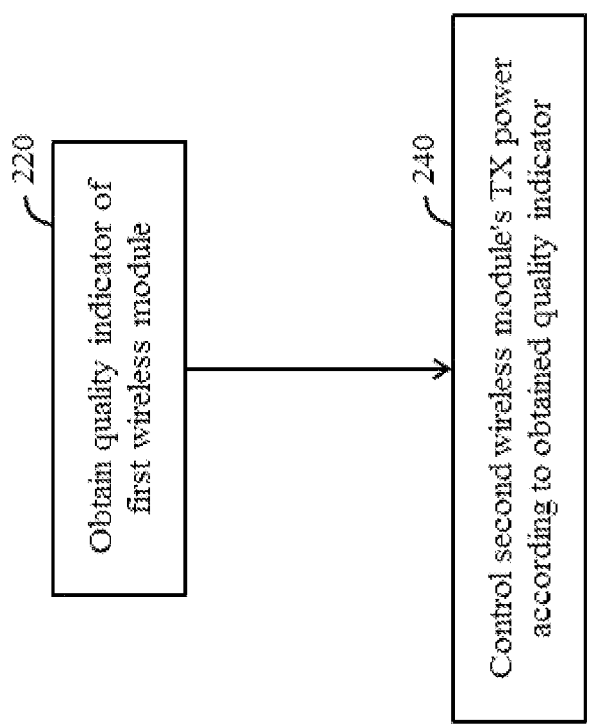
FIG. 2 shows a simplified flowchart of a method to be performed by the wireless communications device of FIG. 1.

FIG. 2 shows a simplified flowchart of a method that may be performed by the wireless communications device 100. This method may help the wireless communications device 100 alleviate the aforementioned self-interference problem, regardless of whether the first wireless module 120 is a SAW-less module or not. As an example, the baseband module 160 may perform this method (based on information provided by the first wireless module 120 and/or the second wireless module 140) whenever the first wireless module 120 is going to process or has just started processing a frame. The frame may include both transmission bursts and receiving bursts.

First, at step 220, the wireless communications device 100 obtains a quality indicator of the first wireless module 120. This quality indicator may imply to what extent the second wireless module 140's transmission of RF signals is interfering with the first wireless module 120's performance. For example, the quality indicator may be a signal to noise ratio (SNR) or a received signal strength indicator (RSSI) of the RF signals received by the first wireless module 120. The lower the quality indicator, the more likely that the second wireless module 140's transmission of RF signals is interfering with the first wireless module 120's performance.

Then, at step 240, the wireless communications device 100 controls the second wireless module 140's transmission (TX) power (i.e. the power level of RF signals provided by the second wireless module 140 to the antenna 114 for transmission) according to the quality indicator. For example, based on the quality indicator, the wireless communications device 100 may determine whether to let the second wireless module 140 restrain its TX power for the first wireless module 120. Simply speaking, when the quality indicator is relatively low, the first wireless module 120's performance may have been severely deteriorated by the second wireless module 140's transmission of RF signals. In response, the wireless communications device 100 may let the second wireless module 140 restrain its TX power, e.g. by reducing the TX power by N dB, to prevent interfering with the first wireless module 120's performance. On the other hand, when the quality indicator is relatively high, the first wireless module 120's performance may still be good enough even though the second wireless module may be using a close by frequency band. As a result, the wireless communications device 100 may let the second wireless module 140 not restrain its TX power for the first wireless module 120.

Figure 3:
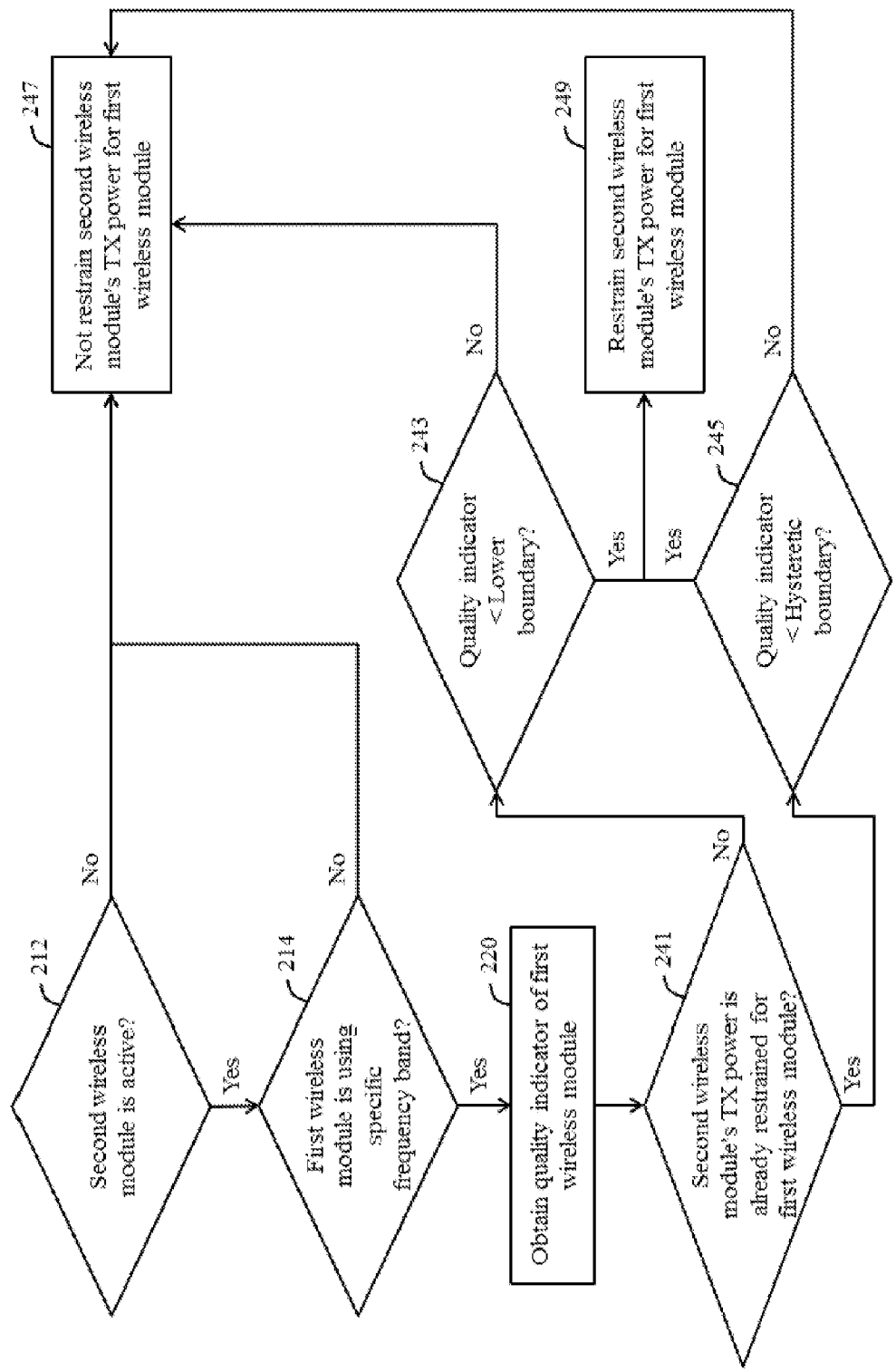
FIG. 3 and FIG. 4 show two exemplary flowcharts, which include more exemplary details, for implementing the method depicted in FIG. 2.

FIG. 3 shows an exemplary flowchart, which include more exemplary details, for implementing the method depicted in FIG. 2. The flowchart shown in FIG. 3 uses five sub-steps, including sub-steps 241, 243, 245, 247, and 249, to implement step 240 shown in FIG. 2. In addition, the flowchart shown in FIG. 3 further includes two preliminary steps 212 and 214. These two preliminary steps may be optional and hence are not depicted in FIG. 2.

To perform the flowchart shown in FIG. 3, the wireless communications device 100 may maintain a power dependency flag using a register. The wireless communications device 100 may use the baseband module 160 to set/reset the flag; and the state of the flag will be one of several factors considered by the second wireless module 140 in determining its TX power. In other words, the second wireless module 140 may control a programmable gain amplifier (PGA) on its transmission path according to the state of the power dependency flag and other factors.

The second wireless module 140 may read the state of the power dependency flag to determine whether to restrain its TX power to prevent interfering with the first wireless module 120. For example, if the power dependency flag is at a first state, which may be a default state, the second wireless module 140 needs not to restrain its TX power for the first wireless module 120. In other words, the second wireless module 140 may control its TX power independently, without considering whether it is interfering with the first wireless module 120. On the other hand, if the power dependency flag is at a second state, the second wireless module 140 needs to restrain its TX power for the first wireless module 120. In other words, the second wireless module 140 needs to maintain its TX power at a relatively lower level to avoid inflicting too much interference on the first wireless module 120. All else being equal, the state of the power dependency flag may cause the second wireless module 140 to either maintain its TX power or lower down the power by N dB, where N may be a predetermined parameter. In the example shown in FIG. 3, the wireless communications device 100 will set the power dependency flag to or maintain the flag at the first state every time it enters sub-step 247, and set the power dependency flag to or maintain the flag at the second state every time it enters sub-step 249.

At step 212, the wireless communications device 100 determines whether the second wireless module 140 is active. If the answer is no, the wireless communications device 100 directly concludes that the risk of self-interference does not exist and as a result enters sub-step 247; otherwise, the wireless communications device 100 goes to step 214 to do more determination before making a conclusion. At step 214, the wireless communications device 100 determines whether the first wireless module 120 is using a frequency band that may result in self-interference. If the answer is no, the wireless communications device 100 enters sub-step 247 because the risk of self-interference does not exist; otherwise, the wireless communications device 100 goes to step 220 because the risk of self-interference does exist. For example, the frequency band of potential risk of self-interference may be the 1800 MHz DCS band or the 1900 MHz PCS band. In other words, if the wireless communications device 100 is using either or both of these two bands, e.g. to facilitate a talking link or a data line between the wireless communications device 100 and a base station, the wireless communications device 100 will enter step 220.

After obtaining the RSSI (which serves as an example of the aforementioned quality indicator) at step 220, the wireless communications device 100 will then go to sub-step 241. At sub-step 241, the wireless communications device 100 determines whether the second wireless module 140's TX power is already restrained for the first wireless module 120. If the answer is no, the wireless communications device 100 enters sub-step 243; otherwise, the wireless communications device 100 goes to sub-step 245. For example, at sub-step 241, the wireless communications device 100 may check the state of the power dependency flag, and either enter sub-step 243 if the flag is in the first state or enter sub-step 245 if the flag is in the second state.

At sub-step 243, the wireless communications device 100 determines whether the first wireless module 120's RSSI is lower than a predetermined lower boundary. When the answer to the question is no, it means that although the first and second wireless modules 120 and 140 are using close frequency bands at the same time, the first wireless module 120 is not severely interfered and still have good enough performance. As a result, there is no need to restrain the second wireless module 140's TX power for the first wireless module 120. Therefore, if the answer to the question is no, the wireless communications device 100 will enter sub-step 247; otherwise, the wireless communications device 100 will go to sub-step 249.

At sub-step 245, the wireless communications device 100 determines whether the first wireless module 120's RSSI is lower than a predetermined hysteretic boundary, which is higher than the predetermined lower boundary. If the answer is no, the wireless communications device 100 enters sub-step 247; otherwise, the wireless communications device 100 goes to sub-step 249. The inclusion of the hysteretic boundary may prevent the second wireless module 140 from adjusting its TX power for the first wireless module 120 too frequently. Assume that the risk of self-interference does exist and the TX power is not restrained, the wireless communications device 100 will enter sub-step 249 to start restraining the second wireless module's TX power by setting the flag to the second state if the RSSI has decreased to below the lower boundary. Assume that the risk of self-interference does exist and the TX power is already restrained, the wireless communications device 100 will enter sub-step 249 to keep restraining the second wireless module's TX power by maintaining the flag at the second state if the RSSI remains below the hysteretic boundary. Assume that the risk of self-interference does exist and the TX power is already restrained, the wireless communications device 100 will enter sub-step 247 to stop restraining the second wireless module's TX power by setting the flag to the first state if the RSSI has increased to above the hysteretic boundary.

At sub-step 247, because either the risk of self-interference does not exist or the interference seems not severe, the wireless communications device 100 allows the second wireless module 140 to not restrain its TX power for the first wireless module 120. As mentioned above, at sub-step 247, the wireless communications device 100 may set the power dependency flag to the first state or keep the flag in the first state. As a result of sub-step 247, the second wireless module 140 will not lower down its TX power for the first wireless module 120. This does not mean that the second wireless module 140 will not alter its TX power for other reasons. The second wireless module 140 may still adjust the TX power according to its power control mechanism, but to prevent affecting the first wireless module 120's performance may not be a reason of the TX power adjustment.

At sub-step 249, because there is a risk of self-interference and the interference may be severe, the wireless communications device 100 lets the second wireless module 140 restrain its TX power for the first wireless module 120. As mentioned above, at sub-step 249, the wireless communications device 100 may set the power dependency flag to or keep the flag in the second state. As a result of sub-step 249, the second wireless module 140 will decrease its TX power, e.g. by N dB, for the first wireless module 120 or maintain the TX power if it has already lowered down the TX power for the first wireless module 120. In addition, the second wireless module 140 may keep considering other factors in determining whether and how to adjust its TX power.

Figure 4:
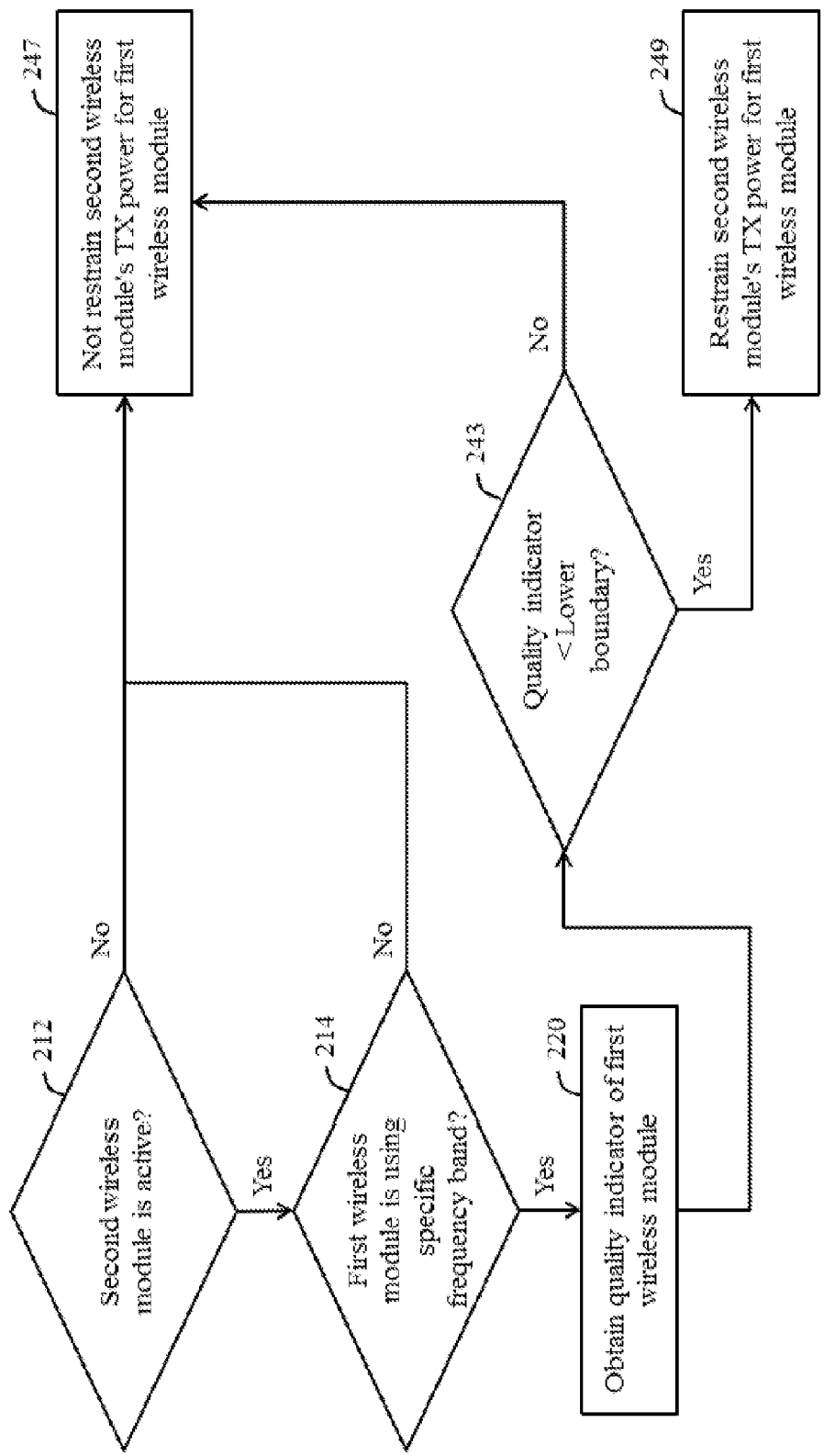

FIG. 4 shows another exemplary flowchart for implementing the method depicted in FIG. 2. The flowchart shown in FIG. 4 is different from the one shown in FIG. 3 only in that the former does not include sub-steps 241 and 245. In other words, the flowchart shown in FIG. 4 uses only sub-steps 243, 247, and 249 to implement step 240 shown in FIG. 2. Because the flowchart shown in FIG. 4 does not use the predetermined hysteretic boundary, the flowchart may cause the second wireless module 140 to adjust it TX power for the first wireless module 120 more frequently. In other aspects, the flowchart shown in FIG. 4 is the same as or very similar to the one shown in FIG. 3.

One of the advantages of the embodiments described above is that they may allow the first wireless module 120 to leave out a SAW filter and be a SAW-less module. Otherwise, the SAW filter (the cost of which may be more than negligible) may be an indispensable component of the wireless communications device 100. Therefore, the embodiments may reduce the wireless communications device 100's overall hardware cost. Another of the advantages is that the embodiments may help the wireless communications device 100 to ensure the first wireless module 120's performance by mitigating the self-interference problem automatically. Even if the first wireless module 120 is a SAW-less one, the embodiments may still allow the first and second wireless modules 120 and 140 to be active at the same time, using close frequency bands, without interfering with each other severely.

In the foregoing detailed description, the invention has been described with reference to specific exemplary embodiments thereof. It will be evident that various modifications may be made thereto without departing from the spirit and scope of the invention as set forth in the following claims. The detailed description and drawings are, accordingly, to be regarded in an illustrative sense rather than a restrictive sense.

What is claimed is:

1. A method performed by a wireless communications device, the wireless communications device comprising a first wireless module and a second wireless module, the method comprising:
   obtaining a quality indicator of the first wireless module;
   checking if the quality indicator of the first wireless module is lower than a predetermined boundary; and
   reducing a TX power of the second wireless module if the quality indicator of the first wireless module is lower than the predetermined boundary;
   wherein the first wireless module is designed to perform wireless communications using a first frequency band and the second wireless module is designed to perform wireless communications using a second frequency band; and the step of reducing the TX power of the second wireless module comprises:
      starting restraining the TX power of the second wireless module for the first wireless module if the quality indicator has decreased to below a first predetermined boundary;
      keeping restraining the TX power of the second wireless module for the first wireless module if the quality indicator remains below a second predetermined boundary; and
      stopping restraining the TX power of the second wireless module for the first wireless module if the quality indicator has increased to above the second predetermined boundary;
      wherein the second predetermined boundary is higher than the first predetermined boundary.

2. A method performed by a wireless communications device, the wireless communications device comprising a first wireless module and a second wireless module, the method comprising:
   obtaining a quality indicator of the first wireless module;
   checking if the quality indicator of the first wireless module is lower than a predetermined boundary; and
   reducing a TX power of the second wireless module if the quality indicator of the first wireless module is lower than the predetermined boundary;

wherein the first wireless module is designed to perform wireless communications using a first frequncy band or a 1900 MHz band and the second wireless module is designed to perform wireless communications using a second frequency band; and the step of reducing the TX power of the second wireless module comprises:
determining a state of a power dependency flag according to the quality indicator;
wherein the second wireless module is configured to check the state of the power dependency flag to determine whether to restrain the TX power for the first wireless module.

3. The method of claim 1, wherein the quality indicator is an RSSI of RF signals received by the first wireless module.

4. The method of claim 1, wherein the quality indicator is a SNR of RF signals received by the first wireless module.

5. The method of claim 1, wherein the first wireless module is a GSM/GPRS module.

6. The method of claim 1, wherein the second wireless module is a Bluetooth module.

7. The method of claim 1, wherein the second wireless module is a Wi-Fi module.

8. The method of claim 1, wherein the first wireless module neither comprises nor is coupled to a SAW filter.

9. The method of claim 1, wherein the first frequency band is a 1800 MHz band or a 1900 MHz band.

10. The method of claim 1, wherein the second frequency band is a 2450 MHz band.

11. The method of claim 1, wherein the first frequency band is a 1800 MHZ band or a 1900 band.

12. The method of claim 1, wherein the second frequency band is a 2450 MHz band.

* * * * *